(12) United States Patent
Barna et al.

(10) Patent No.: US 8,127,628 B2
(45) Date of Patent: Mar. 6, 2012

(54) GAS METER READING SYSTEM

(75) Inventors: Anthony F. Barna, North Massapequa, NY (US); Lawrence P. Nardo, Brooklyn, NY (US); Charles W. Melvin, Jr., Dudley, GA (US); Jason P. Walton, Byron, GA (US)

(73) Assignees: Consolidated Edison Company of New York, Inc., New York, NY (US); Smartsynch, Incorporated, Jackson, MS (US)

( * ) Notice: Subject to any disclaimer, the term of this patent is extended or adjusted under 35 U.S.C. 154(b) by 451 days.

(21) Appl. No.: 12/368,610

(22) Filed: Feb. 10, 2009

(65) Prior Publication Data

US 2010/0199747 A1    Aug. 12, 2010

(51) Int. Cl.
*G01D 21/00* (2006.01)

(52) U.S. Cl. ............................ 73/866.5; 73/52

(58) Field of Classification Search .................. 73/40.7
See application file for complete search history.

(56) References Cited

U.S. PATENT DOCUMENTS

| | | | |
|---|---|---|---|
| 3,945,018 A | 3/1976 | Suwama et al. | |
| 4,811,011 A | 3/1989 | Sollinger | |
| 5,406,075 A | 4/1995 | Pettenden | |
| 6,426,497 B1 | 7/2002 | Martinez et al. | |
| 6,437,692 B1 | 8/2002 | Petite et al. | |
| 6,784,807 B2 | 8/2004 | Petite et al. | |
| 6,836,737 B2 | 12/2004 | Petite et al. | |
| 6,895,069 B2 * | 5/2005 | Kim | 377/3 |
| 7,019,667 B2 | 3/2006 | Petite et al. | |
| 7,042,368 B2 | 5/2006 | Patterson et al. | |
| 7,049,976 B2 | 5/2006 | Hunt et al. | |
| 7,209,840 B2 | 4/2007 | Petite et al. | |
| 7,228,726 B2 * | 6/2007 | Kates | 73/40 |
| 7,248,181 B2 | 7/2007 | Patterson et al. | |
| 7,377,137 B1 * | 5/2008 | Bednarz | 70/34 |
| 7,377,184 B1 * | 5/2008 | Schlachter | 73/861.53 |
| 7,443,313 B2 | 10/2008 | Davis et al. | |
| 2008/0302172 A1 | 12/2008 | Kates | |

FOREIGN PATENT DOCUMENTS

| | | |
|---|---|---|
| EP | 816601 A2 | 1/1998 |
| EP | 1865290 | 12/2007 |
| JP | 726798 Y2 | 6/1995 |
| JP | 9166459 | 6/1997 |
| JP | 2006011642 | 1/2006 |
| JP | 2006077508 A | 3/2006 |

(Continued)

OTHER PUBLICATIONS

International Search Report dated Jun. 22, 2010 for International Application No. PCT/US2009/064585.

(Continued)

*Primary Examiner* — Hezron E Williams
*Assistant Examiner* — Paul West
(74) *Attorney, Agent, or Firm* — Cantor Colburn LLP

(57) ABSTRACT

A gas meter reading system is provided that allows automated meter reading capability to be incorporated with sealed mechanical type gas meters. The reading system is mounted to the window of the meter adjacent to the measurement dial. The reading system senses the rotation of the dial and provides data, such as a pulse, that may be recorded by an external source. A method of detecting for leaks with a gas meter having a reading system is also provided.

15 Claims, 8 Drawing Sheets

FOREIGN PATENT DOCUMENTS

| | | |
|---|---|---|
| KR | 200166049 | 2/2000 |
| KR | 100273091 B1 | 9/2000 |
| KR | 20070061112 A | 6/2007 |
| KR | 100760535 B1 | 9/2007 |
| KR | 20080029503 | 4/2008 |
| KR | 20080095992 | 10/2008 |
| WO | 2007050022 A2 | 5/2007 |

OTHER PUBLICATIONS

International Search Report dated Jul. 5, 2010 for International Application No. PCT/US2009/065123.

International Search Report dated Jun. 30, 2010 for International Application No. PCT/US2009/065331.

International Search Report dated Jun. 4, 2010 for International Application No. PCT/US2009/064182.

Written Opinion of the International Searching Authority mailed Jun. 22, 2010 for International Application No. PCT/US2009/064585.

Written Opinion of the International Searching Authority mailed Jul. 5, 2010 for International Application No. PCT/US2009/065123.

Written Opinion of the International Searching Authority mailed Jun. 30, 2010 for International Application No. PCT/US2009/065331.

Written Opinion of the International Searching Authority mailed Jun. 4, 2010 for International Application No. PCT/US2009/064182.

International Preliminary Report on Patentability, dated Aug. 25, 2011 for International Application PCT/US2009/065331.

* cited by examiner

GAS METER READING SYSTEM

BACKGROUND OF THE INVENTION

The present invention relates generally to the application of automatic meter reading (AMR) or advanced metering infrastructure (AMI) modules on a gas meter and more particularly to a meter reading system capable of monitoring gas usage on a sealed mechanical gas meter.

Mechanical measurement devices are widely installed in a variety of applications to provide control and measurement functionality. These measurement devices, such as a gas meter or a pressure gauge for example, provide a visual indication of usage or operating performance. These measurement devices are popular due to the high reliability and long operational life spans. As a result a large population of such devices are installed in the field.

One type of such device is the utility gas meter 20 as is illustrated in FIG. 1 and FIG. 2. The meter 20, sometimes referred to as a "tin case meter", includes a housing 22 that is sealed to prevent tampering and leakage. The housing 22 includes an inlet 32 and an outlet 34 that allow gas to enter and exit the meter 20. The inlet 32 and outlet 34 are coupled to a measurement mechanism (not shown) that meters the amount of gas passing through the meter 20. Gas meters use a number of different types of measurement mechanisms such as but not limited to bellows, diaphragm, rotary, turbine, orifice, ultrasonic flow, or coriolis mechanisms.

A window 24 is provided on the meter to allow utility personnel and customers to view of a set of dials 26. The set of dials 26 includes a first set of cumulative dials 28 that the utility personnel use for recording the amount of gas consumed. The set of dials 26 also includes a measurement dial 30 that is coupled to the gas meters measurement mechanism (not shown). The measurement dial 30 rotates in response to movement of the measurement mechanism. The measurement dial 30 is further coupled to rotate the cumulative dials 28 as gas passes through the meter 20. On a periodic basis, utility personnel make a visual inspection of the meter 20. During this inspection, the utility personnel note the amounts indicated on the cumulative dials so that the consumer can be charged for the appropriate usage.

To improve efficiencies in operations, businesses often desire to remotely read meters to avoid the costs associated with manually reading the measurement devices. Some meters may be located in inconvenient locations, such as a residential basement or kitchen for example. If personnel cannot access the meter, such as when no one is home where the device is located, the personnel are forced make repeated trips or estimate the measurement readings. As a result, many modern gas meters may include communications capability added into the device that allows the automated reading of the meter from a remote location.

Due to the large installed base of utility gas meters, it is cost prohibitive to replace all installed meters. For example, production of the tin case type gas meter was initiated in the 1920s and continued until the 1970s with millions of units produced and still in use. The operational longevity of these mechanical meters greatly extends the amount of time it would take to convert the entire installed base to a more modern meter. To alleviate these issues, automated reading devices have been proposed to retrofit to the meter and allow remote monitoring of the meter. However, these remote monitoring devices have been limited to use with meters where the measuring mechanisms can be removed on-site without allowing gas to escape into the atmosphere.

Most tin case utility gas meters are sealed and the meter was designed to contain no serviceable parts. As a result, the attempts to retro-fit existing utility gas meters with automated meter reading equipment have met with little success for the sealed tin cased meter since the measuring apparatus can not be removed with breaching the sealed enclosure. Further complicating these attempts at adapting these remote reading modules to tin cased meters is that the cases are typically made of a ferrous metal which blocks attempts to use some noninvasive measurement means, such as magnetic devices.

Another issue encountered with the proposed automated reading devices is that they must comply with the stringent requirements of public utility boards and agencies. These agencies place a number of requirements on measurement devices to ensure that the consumer is being accurately charged for the gas consumed. Another regulation requires that the consumer and utility personnel still be able to view the dials 26 after the automated reading device is installed. This ensures that the consumers can check the usage themselves and also allows utility personnel to check for leaks when the gas system is serviced.

Thus, while existing gas meter reading devices are suitable for their intended purposes, there remains a need for improvements in sealed metering devices, such as sealed tin cased meters. In particular, there remains a need for improvements in providing a gas meter reading system that allows for automated reading of all type of gas meters, regardless of construction, while complying with governmental and industry requirements.

SUMMARY OF THE INVENTION

A gas meter is provided having a sealed housing. A dial is mounted in the housing. The dial indicates an amount of gas that flowed through the housing. A window is mounted to the housing and adjacent the dial, wherein the window is arranged to allow viewing of the dial. A removable sensor is coupled to the window opposite the dial.

A sensing system for a sealed gas meter having a dial viewable through a window is also provided. The sensing system includes a base sized to fit over the window. The base has an opening there through and a wall projecting from the perimeter of the opening, the wall forming an enclosed area. The base is made from a translucent material. A sensor is removably coupled to the wall, where the sensor includes an optical sensor arranged to record the motion of the dial.

A method is also provided for checking leaks in a gas system having a sealed gas meter. The sealed gas meter includes a sensor arranged on a meter window adjacent a dial. The method includes the steps of turning off gas to said meter and removing the sensor. An indicia is made designating a position of the dial. The gas to the meter is turned on and the method waits a predetermined amount of time. Finally, the position of the dial is compared to the indicia.

BRIEF DESCRIPTION OF THE DRAWINGS

Referring now to the drawings, which are meant to be exemplary and not limiting, and wherein like elements are numbered alike.

DETAILED DESCRIPTION

Figure 1:
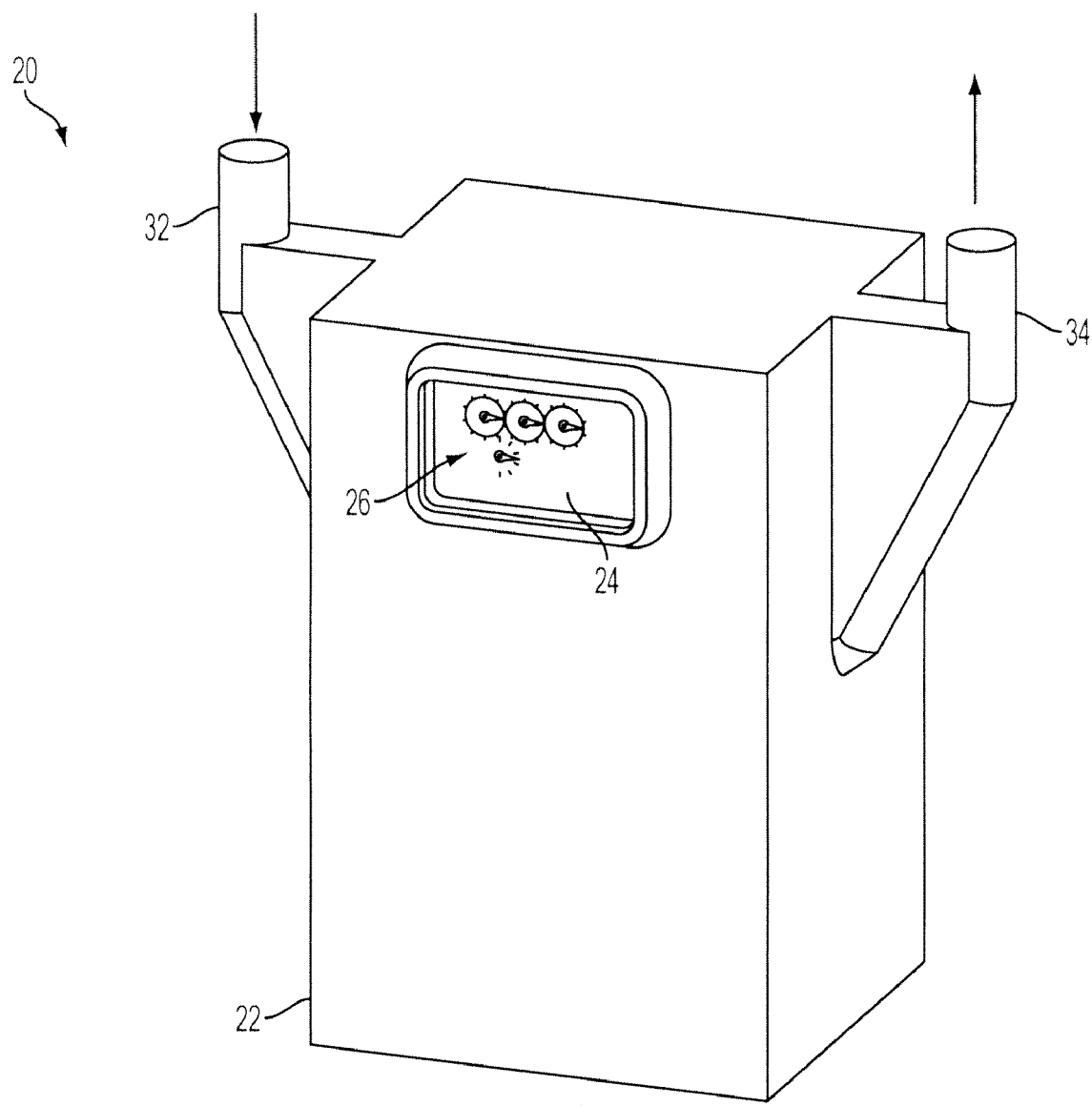
FIG. 1 is a perspective view illustration of a prior art utility gas meter.
Figure 2:
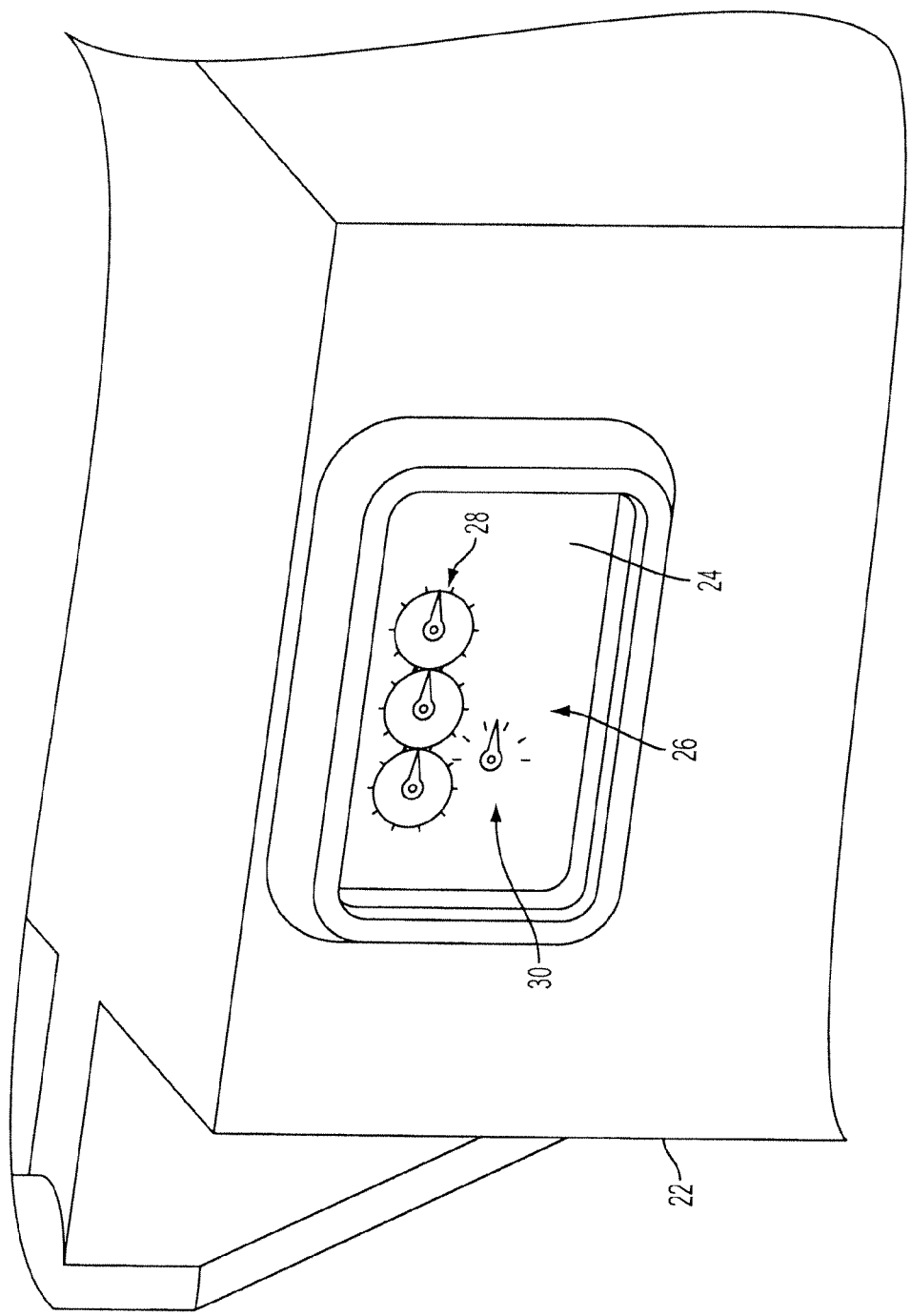
FIG. 2 is a partial perspective view illustration of the dial portion of the utility gas meter of FIG. 1.
Figure 3:
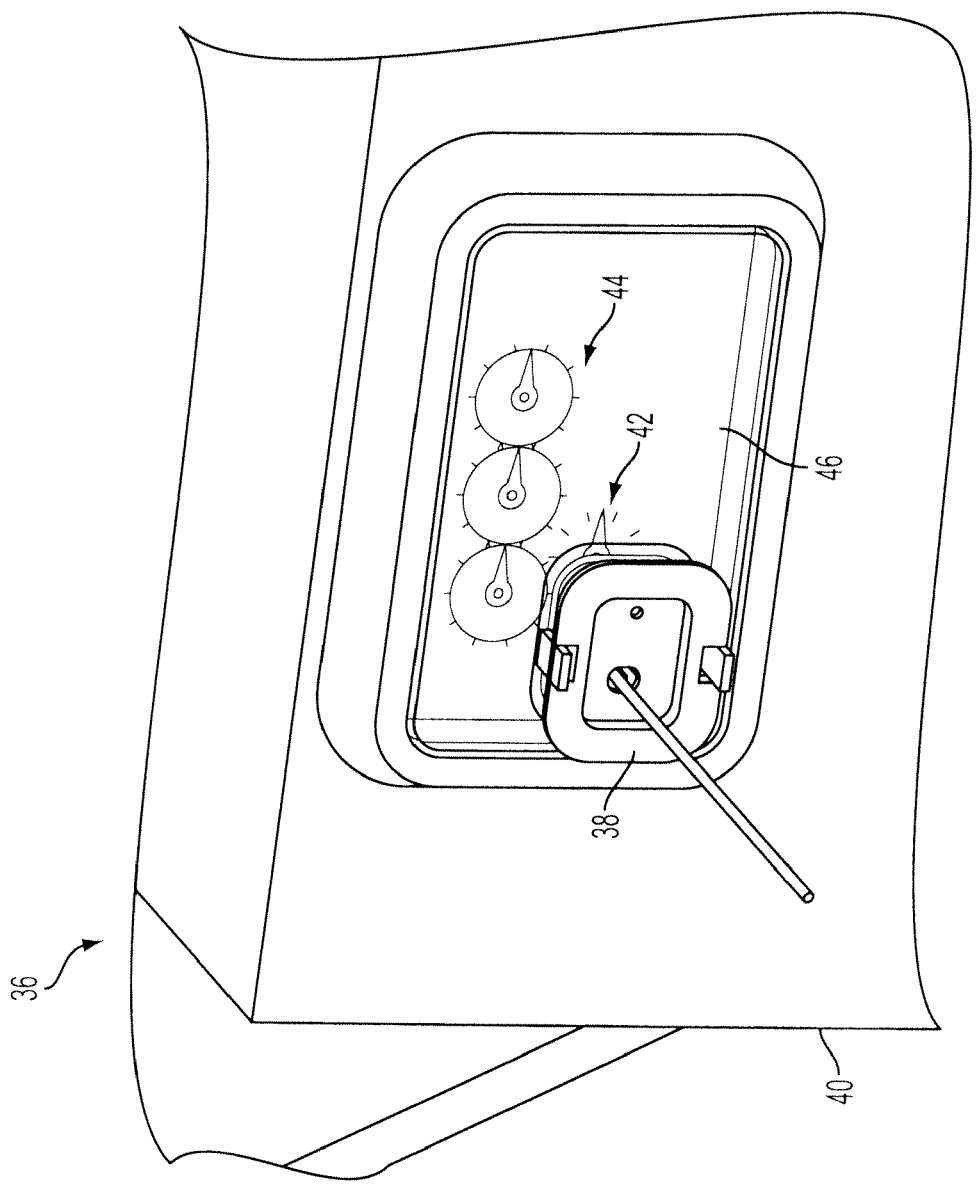
FIG. 3 is perspective view illustration of the a utility gas meter having a meter reading system in accordance with one embodiment of the invention.
Figure 4:
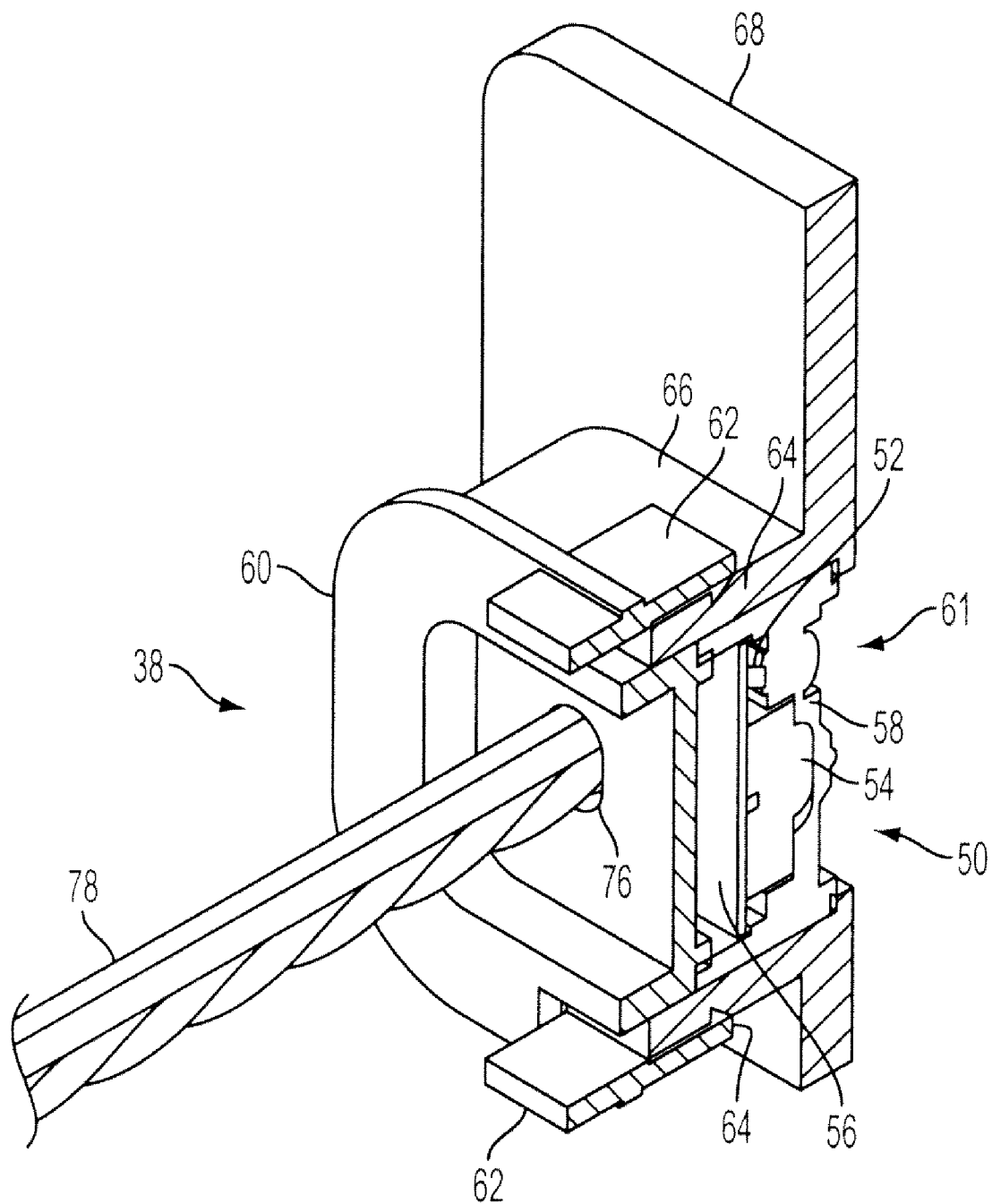
FIG. 4 is a partial sectional perspective view illustration of the meter reading system of FIG. 3.
Figure 5:
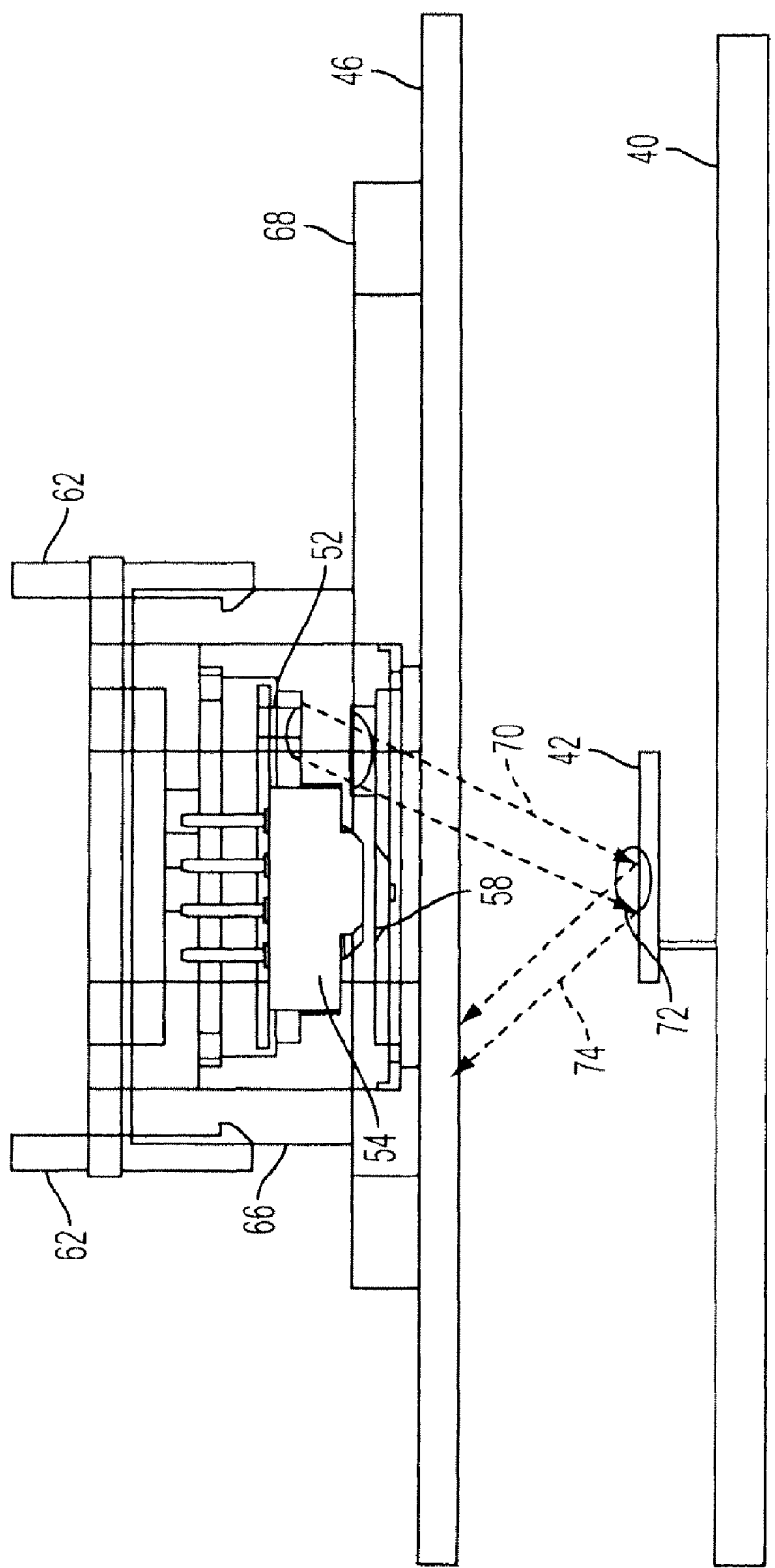
FIG. 5 is schematic side plan view illustration of the meter reading system of FIG. 3.

FIGS. 3-5 illustrate an exemplary embodiment of a utility gas meter 36 having an automated meter reading system 38. The utility gas meter 36 may be used to measure any type of gas, such as natural gas or propane for example, that is delivered to an end consumer. In general, the meter 36 provides a means for the gas supplier, such as a public utility for example, to determine how much of the gas has been delivered to the end user. The meter 36 is of a utility grade, meaning that the measurement devices contained within the meter 36 are sufficiently accurate to allow for billing under applicable government regulations.

The meter 36 includes a housing 40 that includes a measurement apparatus (not shown) that measures the amount of gas flowing through the meter 36. In the exemplary embodiment, the measurement apparatus is a bellows or a diaphragm type mechanism as is known in the art. The measurement apparatus is coupled to a measurement dial 42 that rotates in an odometer type fashion in response to gas flowing through the measurement apparatus. In one embodiment, one revolution of the measurement dial 42 indicates the flow of 1 cubic foot of gas. In other embodiments, a single revolution of the measurement dial 42 may indicate another flow volume, such as a flow of 0.5 cubic foot of gas. The measurement dial 42 is coupled to a set of cumulative dials 44 that increment to indicate the total amount of gas delivered.

A window 46 is coupled to the housing 40 to allow the dials 42, 44 to be viewed. The window 46 includes a seal (not shown) that protects the dials 42, 44 and the interior of the housing 40 from contamination. It should be appreciated that it is desirable to maintain the window 46 in place so that the interior of the housing 40 remains sealed. If the window 46 is removed contaminants may enter and interfere with the measurement of gas, or potentially allow gas to escape. The meter reading system 38 is coupled to the window 46 adjacent the measurement dial 42. The reading system 38 includes a sensor that detects the rotation of the measurement dial 42 with sufficient accuracy for utility billing.

The reading system 38 provides a noninvasive means of monitoring the flow of gas through the meter 36. In the exemplary embodiment, the reading system 38 includes an optical sensor assembly 50, such as that described in U.S. application Ser. No. 61/151,280 "Optical Reading System" filed concurrently herewith which is incorporated by reference herein in its entirety. The optical sensor assembly 50 includes a light emitting diode 52 (LED) and a complimentary metal-oxide semiconductor (CMOS) sensor 54 that are mounted to a printed circuit board 56. A lens member 58 is opposite the printed circuit board 56.

The optical sensor assembly 50 is mounted to a cap member 60. The cap member 60 includes a pair of tabs 62 arranged on opposite sides of the cap member 60. The tabs 62 are flexible to allow the engagement with a recess 64 in a wall portion 66. The cap member 60 encloses one end of the area formed by the wall 66. In the exemplary embodiment, the wall portion 66 extends from a translucent base 68. The base 68 adapted to be mounted to the window 46 to allow retrofitting of utility gas meters 36 in the field without disabling or removing the meter 36 from service. It should be appreciated that the use of a translucent base 68 provides advantages in that the utility personnel and customers can still manually read the dials 44 while the reading system 38 collects data. In another embodiment, the base 68 completely covers the window 44 and acts as an optical filter to prevent ambient light from interfering with the operations of the LED 52 or CMOS sensor 54. In yet another embodiment, the wall 66 extends from the window 46. In all of these embodiments, an opening 61 is opposite the cap member 60.

During operation, the exemplary optical sensor 50 activates the LED 52 directing light 70 into an area of interest 72. The area of interest 72 is selected to lie within a small portion of the area in which the measurement dial 42 rotates. When the measurement dial 42 is not in the area of interest 72, the light from the LED 52 reflects into the CMOS sensor 54. Thus, as the measurement dial 42 rotates through the area of interest 72, light 74 is reflected away from the CMOS sensor 54 resulting in a darker image. This allows the CMOS sensor 54 to acquire images of the measurement dial 42 entering and leaving the area of interest 72. A processor (not shown) on the printed circuit board 56 interrogates these images and determines when the dial has rotated into the area of interest 72. In other embodiments, the printed circuit board 56 interrogates these images and determines when the dial has rotated into the area of interest 72. A hole 76 in the cap member 60 allows a communications and power wire 78 to connect with the printed circuit board 56. The utility may retrieve or receive data from the reading system 38 via the wire 78 and an appropriate communication module. In the exemplary embodiment, the data is in the form of a pulse that is accumulated to determine gas usage. The transferred data includes the number of times that the measurement dial 42 rotates through the area monitored by the CMOS sensor 54. It should be appreciated that the communication between the utility and the reading system 38 or appropriate communication module may also occur wirelessly, such as through a cellular, bluetooth, or IEEE 802.11 communication technology for example.

In an alternate embodiment, the printed circuit board 56 captures images using the CMOS sensor array 54. These images are acquired sequentially and then analyzed by a microprocessor on the printed circuit board 56, such as with a digital signal processor for example, to determine the direction and magnitude of any detected movement. Data related to the pixel values, or direction and magnitude of movement is then placed in the registers where it can be accessed by other processors on the printed circuit board 56. These registers may include an averaging register, or an image register for example. The averaging register stores a calculated value that averages the pixel values captured by the CMOS sensor array 54. As the image changes, the average pixel value of the array will also change. The changing of the average pixel value provides a means for the detecting the presence of an object, such as measurement dial 42 for example, in the area of interest 72. The registers may also include an image register that contains values of each of the individual pixels. By extracting data from the image register, the acquired image may be reconstructed. It should be appreciated that the image register may be composed of a number of individual registers.

Figure 6:
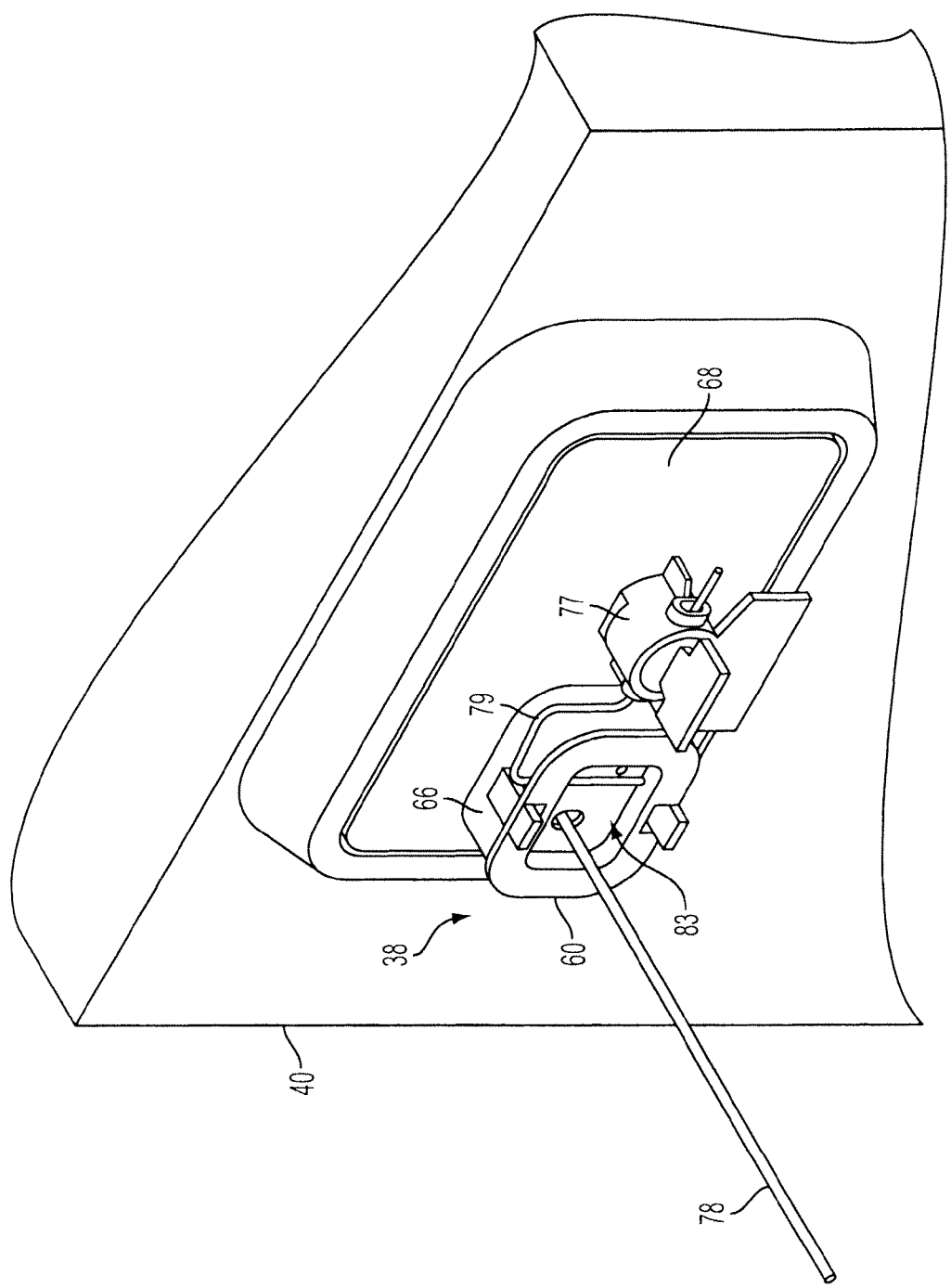
FIG. 6 is a perspective illustration of a utility gas meter having a locking device.

It should be appreciated that where the meter is providing data that is used for billing purposes, it is desirable to provide a means of preventing a third party from tampering with the reading system 38. FIG. 6 illustrates an exemplary tamper lock 77. The tamper lock 77 provides an indication to the operator if the reading system 38 has been disassembled or opened. In the exemplary embodiment, the tamper lock 77 includes a lock wire 79 that extends from a tamper lock 77 and through holes in the wall 66 and cap member 60. The wire 79 extends across a recessed area 83 in the cap member 60 and back through an additional set of openings in the wall 66 and cap member 60 on the opposite side. The wire 79 then returned to the tamper lock 77. In the exemplary embodiment, the tamper lock 77 includes a ratchet type mechanism that pulls the wire in only one direction allowing the wire to be securely tightened as the ratchet mechanism is engaged. Since the ratchet allows the wire 79 to be pulled in only one direction, the wire 79 needs to be cut before the cap member 60 can be removed from the walls 66. Therefore, as long as the wire 79 remains intact, the operator has some assurance that there has been no interference in the operation of the reading system 38.

During use, the system downstream from the meter 36 may require maintenance or servicing. For example, a new appliance or a stove may be installed. In these instances, the gas is disconnected from the area requiring service and maintenance is performed (e.g. the appliance). Under standard industry practice, to ensure that the integrity of the gas piping has not been compromised and that there were no leaks, the service personnel place an indicia or mark, such as with a grease pencil for example, indicating the location of the measurement dial 42. The service personnel then turn the gas back on while leaving all appliances connected to the gas system in an off position. The service personnel then wait a short period of time, 5-15 minutes for example, and compare the position of the measurement dial 42 to the indicia.

If the measurement dial 42 moves, the service personnel know there is a leak and additional attention is required. It should be appreciated that leaks are typically small and therefore the measurement dial 42 will only move a small amount if there is a leak. Therefore, the service personnel need a clear and direct view of the measurement dial 42 in order to detect such a leak.

Figure 7:
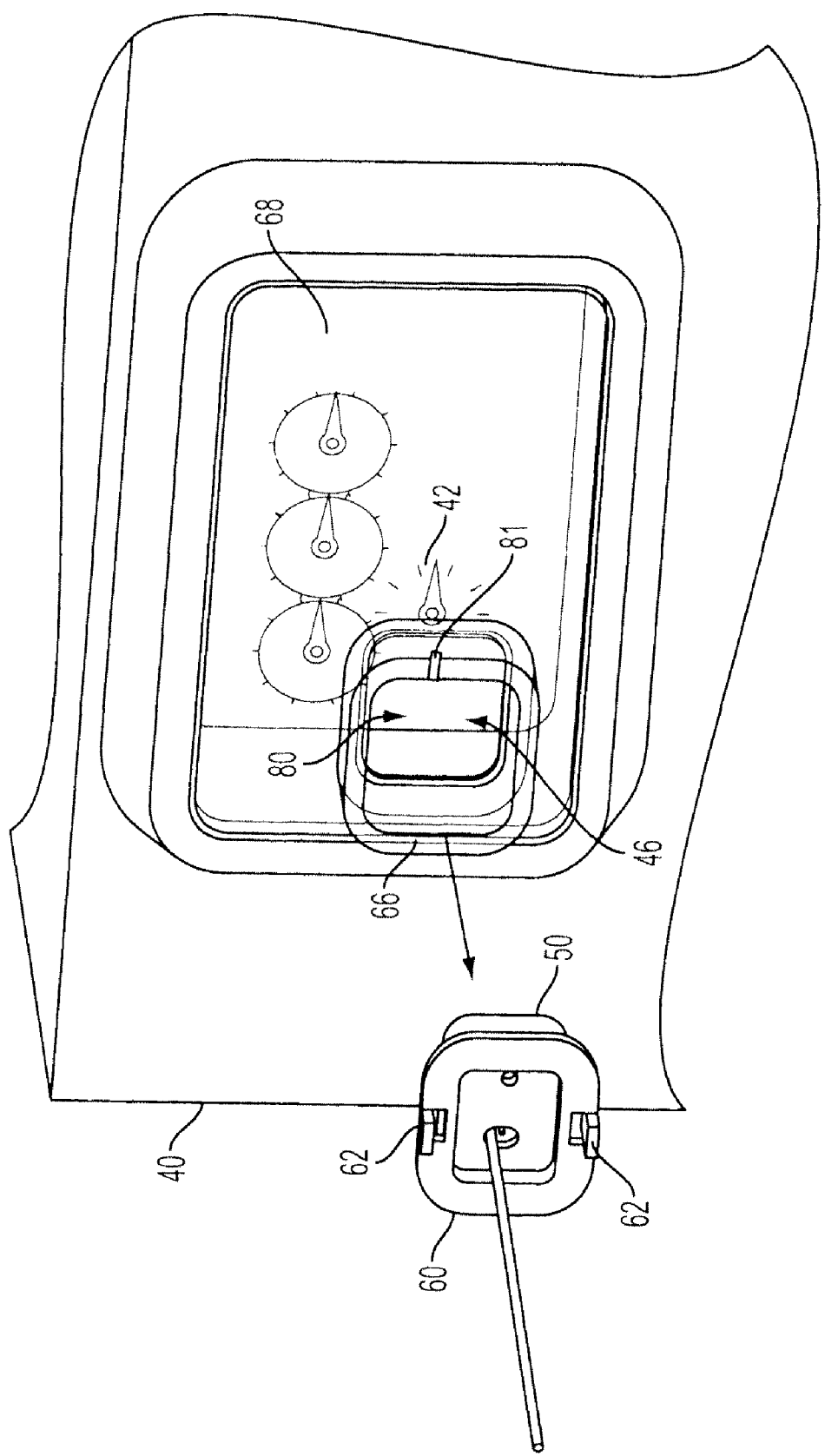
FIG. 7 is a perspective view illustration of a the utility gas meter of FIG. 3 with a reading system removed; and, FIG. 8 is a flow chart describing a method of checking a gas system for leaks in accordance with one embodiment of the invention.

As discussed above, in the exemplary embodiment, the cap member 60 retains the optical sensor assembly 50 to the wall 66 by a snap-fit coupling. As illustrated in FIG. 7, when the tabs 62 are actuated, the cap member 60 and the optical sensor assembly 50 may be removed from the base 68 and window 46. This exposes the enclosed area 80 and the window 46. Thus, once the cap member 60 and optical sensor 50 are removed, the service personnel have a clear and unobstructed view of the measurement dial 42. It should be appreciated that the ability to remove the optical sensor assembly 50 provides advantages in allowing the service personnel to perform a leak check without deviating from industry standard practices.

Figure 8:
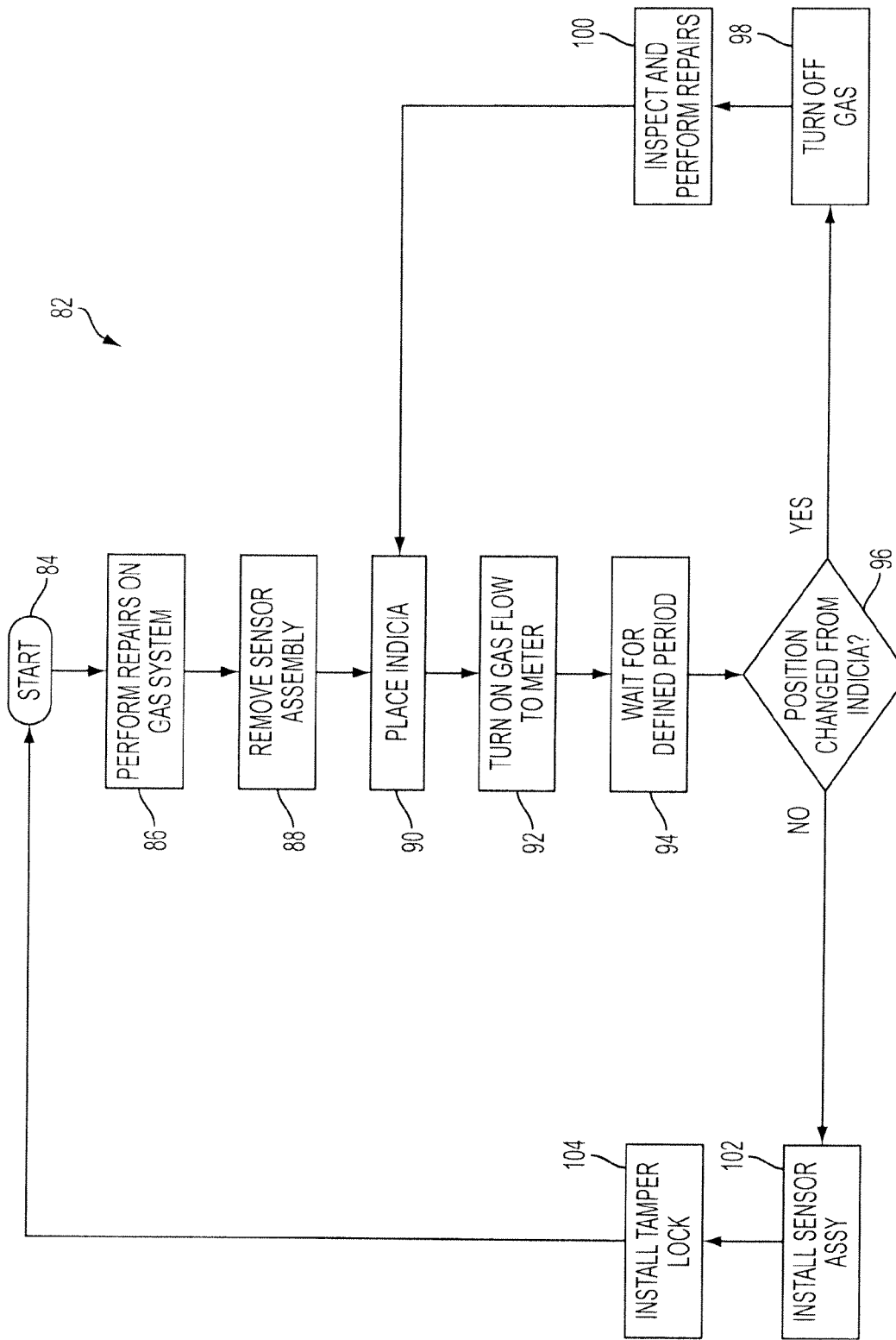

A method 82 of detecting for leaks on sealed gas meters 36 with a reading system 38 is also provided, as illustrated in FIG. 8. The method 82 begins in start block 84 and proceeds to block 86 where repairs are performed on the gas system to which the meter 36 is coupled. It should be appreciated that these repairs may take any form, such as the installation of a new appliance or replacement of a damaged pipe for example. Once the repairs have been completed, the method 82 proceeds to block 88 where the cap member 60 and optical sensor 50 are removed. As discussed above, this exposes the enclosed area 80 and provides on unobstructed view of the measurement dial 42.

The method 82 then proceeds to block 90 where an indicia or mark 81 is made on the sensor base to mark the location of the measurement dial 42. The indicia 81 may be placed in any convenient location, such as the top or inside surface of the wall 66. Alternatively, the service personnel could place the indicia 81 on the window 46. With indicia 81 in place, the gas can be turned back on in to the repaired portion of the system block 92. The method 82 then proceeds to block 94 where a predetermined amount of time is waited. In the exemplary embodiment, the wait period is 5 to 15 minutes.

The method 82 then proceeds to query block 96 where the position of the measurement dial 42 is compared to the location of the indicia 81. If the query block 96 returns an affirmative, this is an indication of a leak in the system. The method 82 then proceeds to block 98 where the gas is once again turned off. With the gas off, the system is inspected and any leaks are repaired in block 100. Once these have been completed, the method 82 loops back to block 90 where the position of the dial is marked with an indicia and the process starts again at block 90 until query block 96 returns a negative.

Once any leaks have been removed from the system, the measurement dial 42 will not move during the wait period of block 94. When this occurs, the query block 96 returns a negative and the method 82 moves on to block 102 where the cap member 60 and the optical sensor 50 are once again installed in the base 68 with the tabs 62 engaging the recess 64 to hold the cap member 60 against the wall 66. Finally a tamper lock 77 is installed in block 104 and the method 82 loops back to start block 84.

The gas meter reading system provided herein includes a number of benefits and advantages. It allows for the retrofitting of sealed gas meters with automated meter reading capability without risk of damage to the meter. The reading system further provides a means for detecting if a third party attempts to tamper with the reading system. Finally, a method is provided that allows service personnel to detect leaks in a repaired system using industry standard protocols with gas meters having a reading system mounted to the front window of the meter.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A gas meter comprising:
a sealed housing;
a dial having a rotating arm mounted in said housing, said dial indicating an amount of gas that flowed through said housing;

a window mounted to said housing and adjacent said dial, wherein said window is arranged to allow viewing of said dial;

a device having a base mounted to a first portion of said window opposite said arm, said base having a wall that forms an enclosed area, said device having a sensor removably coupled to said base, wherein said arm remains visible through a second portion of the window and said base remains coupled to said window when said sensor is removed.

2. The gas meter of claim 1 wherein said sensor comprises a light emitting diode (LED) and a complementary metal oxide semiconductor (CMOS) optical sensor, wherein said LED is arranged to direct light at said dial and said CMOS optical sensor is arranged to obtain images of said dial.

3. The gas meter of claim 1 wherein said sensor includes a cap member having a fastener for removably coupling said sensor to said wall, wherein said wall remains coupled to said window first portion when the cap is removed.

4. The gas meter of claim 3 wherein said base is made from a translucent material.

5. The gas meter of claim 4 further comprising a tamper lock coupled to said wall and said cap member.

6. A sensing system for a sealed gas meter having a dial with an arm viewable through a window, said sensing system comprising:

a base sized to fit over a first portion of said window, wherein said arm is visible from a second portion of said window when said base is coupled to said window, said base having an opening therethrough and a wall projecting from the perimeter of said opening, said wall forming an enclosed area, said base being made from a translucent material;

a cap member removably coupled to said wall;

a sensor coupled to said cap and disposed within said wall, said sensor having an optical sensor arranged to record the motion of said arm.

7. The sensing system of claim 6 wherein said sensor includes an LED and said optical sensor is a CMOS optical sensor positioned within said enclosed area.

8. The sensing system of claim 7 wherein said LED is arranged to direct light through said window into an area occupied by said dial.

9. The sensing system of claim 8 wherein said CMOS optical sensor provides images of said area.

10. The sensing system of claim 6 further comprising a tamper lock coupled to said wall and said cap member.

11. A method of checking for leaks in a gas system having a sealed gas meter on having a window adjacent a dial, said method comprising:

a) providing a device having a base sized to fit over a portion of said window, said base having a wall projecting away from said window, said device further having a sensor coupled to a cap, said cap being removably coupled to said base;

b) turning off gas to said meter;

c) removing said sensor;

d) making an indicia designating a position of said dial on said wall;

e) turning on said gas to said meter;

f) waiting a predetermined amount of time; and, g) comparing said dial position to said indicia.

12. The method of claim 11 further comprising the step of coupling said sensor to said gas meter.

13. The method of claim 12 further comprising the step of performing repairs if said dial moves relative to said indicia.

14. The method of claim 13 further comprising the step of repeating steps d)-g) once said repairs have been completed.

15. The method of claim 14 wherein said predetermined amount of time is 5-15 minutes.

* * * * *